April 29, 1958  W. E. BUCK  2,832,264
HIGH SPEED TURBINE-DRIVEN ROTATING MIRRORS
Filed Aug. 3, 1955

INVENTOR.
WILLARD E. BUCK
BY
Anderson & Spangler
ATTORNEYS

United States Patent Office 2,832,264
Patented Apr. 29, 1958

2,832,264

HIGH SPEED TURBINE-DRIVEN ROTATING MIRRORS

Willard E. Buck, Boulder, Colo.

Application August 3, 1955, Serial No. 526,121

5 Claims. (Cl. 88—96)

This invention relates to high speed photographic equipment; and more particularly, to the turbine-driven rotating mirrors utilized in the framing and sweeping image type cameras for high speed photographic work.

Modern day scientists and engineers are exploring the phenomena that occur in many events of extremely short duration; such as for example, the jets from shaped charges, the shock wave and flame front from high explosives, the nature of a spark discharge, and plastic and elastic deformation. Studies of this nature have necessitated the development of high speed photographic equipment which can be used to photograph the short-lived event in a sequence of pictures that can be analyzed at leisure.

In order to study most of these short-lived events a time resolution of the order of one microsecond is necessary with 0.01 microsecond time resolution being desirable in many cases. The conventional motion picture camera which utilizes the principle of film transport to attain the picture sequence is ineffective as it has been found that approximately 10,000 frames per second is the upper limit at which the film can be moved. This speed, of course, is far too slow for this type of photography. Cameras have now been developed, however, which do not depend upon film transport; but rather, provide means by which an inertialess light beam is swept across the stationary film to obtain the required relative motion. The basic element of both the framing and sweeping image type cameras which are commonly used for this purpose is a high speed turbine-driven rotating mirror which reflects the light beam onto the film. The limiting factor in cameras of both the framing and sweeping image types is the rotational speed of the mirror.

In recent years high speed turbines have been developed by which the mirrors can be rotated at speeds in excess of 10,000 revolutions per second. These turbines are capable of spinning any convenient size mirror up to a speed at which the steel used to make the mirror will burst. It was found that only one or two commercially available steels possessed the tensile strength necessary to withstand rotational speeds of 10,000 R. P. S. without bursting. These turbines are compressed air driven to impart peripheral velocities to the mirror less than the speed of sound; whereas, if it is desired to spin the mirror near its bursting speed, which is approximately twice the speed of sound, lighter gases such as hydrogen and helium are used. The aforementioned turbine-driven rotating mirrors have made it possible to develop cameras of both the framing and sweeping image types which will take a sequence of pictures at the rate of 3,500,000 frames per second with an exposure time of 0.1 microsecond.

It has now been found, however, that the high peripheral velocities to which the mirror is subjected cause a distortion in the polished surface thereof due to the mirror design which, in turn, causes an inaccurate image to be reflected upon the film. It is, therefore, the principal object of the present invention to provide an improved high speed turbine-driven rotating mirror of a design which lessens the effect of the forces tending to distort the polished surface of the mirror; and at the same time, provides a design which sets up forces in opposition to those tending to distort the polished surface thereby eliminating distortion.

Additional objects of the improved high speed rotating mirror of the present invention will be in part apparent and in part pointed out specifically hereinafter in connection with the description of the drawing which follows, and in which.

Figure 8:
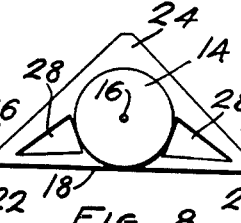
Figure 7:
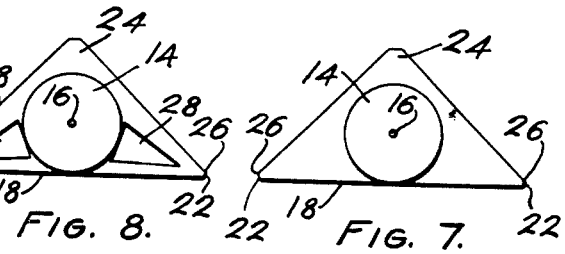
Figure 9:
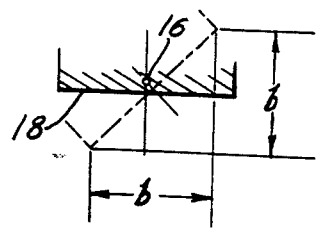
Figure 10:
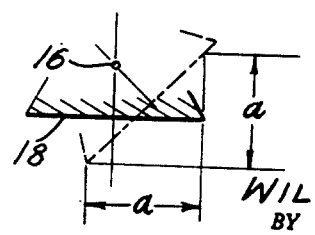

Figures 5, 6, 7 and 8 are diagrammatic end views of the improved rotating mirror of the present invention showing constructions which will provide successively greater forces tending to correct the forces acting to deform the polished face of the mirror; and, Figures 9 and 10 are diagrammatic views illustrating the advantage obtained in reflecting a greater area of the incoming image through a 90° angle of rotation of the mirror by reason of the fact that the axis of rotation is maintained as close as practicable to the polished surface of the mirror.

High speed rotating mirrors for use in framing and sweeping image cameras are formed from a solid block of material, indicated in a general way by numeral 12, having a high ratio of tensile strength to density. Among the commercially available steels, Allegheny Ludlum 609 has been found particularly suitable for this purpose. The block is formed for rotation upon a cylindrical drive shaft 14 which is driven by the high speed turbine, not shown. The axis of rotation 16 of the mirror passes through the center of mass of the block in a direction parallel to the polished face 18 thereof. The mirror is usually polished after the block is formed upon the drive shaft which necessitates the removal of some material from the block on the other side of the axis of rotation to balance the mirror.

Figure 1:
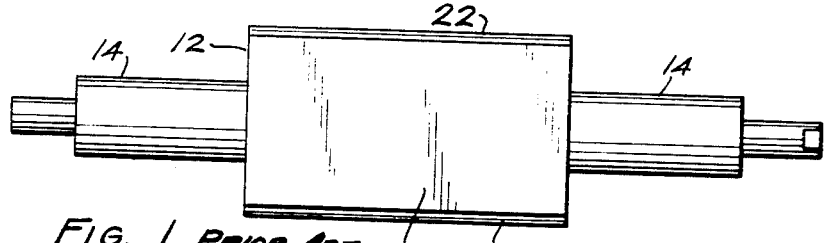
Figure 1 is a view showing the high speed rotating mirror of the present invention formed upon a drive shaft.
Figure 2:
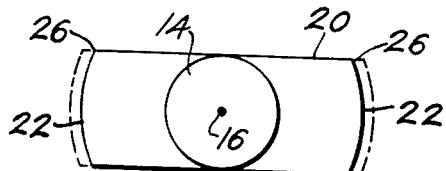
Figure 2 is a diagram showing an end view of the conventional high speed rotating mirror with the dotted lines indicating its tendency to stretch under the high tensional forces created by the peripheral velocities of the mirror.
Figure 3:
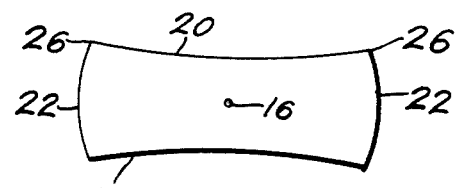
Figure 3 is a diagrammatical view similar to Figure 2 showing the resultant deformation or concavity that takes place in the polished face of the mirror when stretched as in Figure 2.
Figure 5:
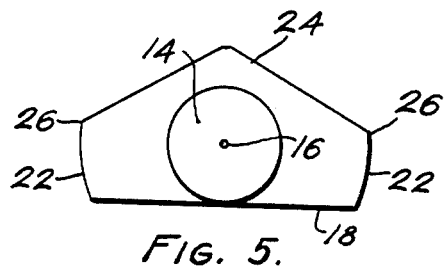

In connection with Figure 2 it will be seen that the conventional high speed rotating mirror has two parallel faces, 18 and 20, parallel to and equidistant from, the axis of rotation 16. When the conventional mirror, illustrated in Figures 2 and 3, is rotated at speeds of several thousand revolutions per second the block tends to stretch into the dotted line position shown in Figure 2. In connection with Figure 3 it will be seen that this stretching action due to the tension in the block created by the high peripheral velocities of the mirror is accompanied by a deformation of the plane parallel faces 18 and 20. The concavity thus produced in the polished face 18 reflects a distorted image onto the film. The greatest stretch occurs adjacent the axis of rotation due to the greater mass of metal pulling at this point as the mirror is rotated at high speed. This stretching effect decreases from the axis of rotation out to the sides 22 of the mirror and produces a concave face 18 which is thought to be parabolic.

As will be explained hereinafter in connection with Figures 9 and 10 of the drawing, it is desirable to maintain the axis of rotation 16 as close to the plane polished face 18 of the mirror as possible. As a practical matter, however, the plane polished face can be no closer to the axis of rotation than a plane tangent to the cylindrical surface of the drive shaft 14. Otherwise, the mirror cannot be polished by any known practical method. This relationship between the polished face of the mirror and the axis of rotation is clearly illustrated in Figures 2, 5, 6, 7 and 8. It is also desirable to utilize the largest planar face of the block as the reflecting surface as the rotational velocity of the mirror is limited by its size.

It has now been found in accordance with the present invention that the aforementioned distortional effect of the conventional rotating mirror can be corrected by the expedient of reducing the mass of the block acting under the influence of the tensional forces to stretch or elongate the polished front face 18 of the block and adding a corresponding mass to the rear of the block 24 opposite the polished face in order to maintain the relationship between the polished face and the axis of rotation without diminishing the area of the polished face. Figures 5 through 8, inclusive, are illustrative of successive degrees of correction which may be attained in the aforementioned manner to compensate for the distortion in the mirrors of Figures 2 and 3. In each of the figures it will be noted that the sides 22 are narrowed by removing material from the rear side edges 26 and adding a corresponding mass of material to the rear central portion of the block. The mirror of Figure 8 is further lightened along the sides 22 by providing openings 28 between the shaft and sides where the material has been removed. Each of the mirror designs of Figures 5 through 8, inclusive, incorporate the foregoing principle of construction and are, therefore effective to correct distortion in a high speed rotating mirror by setting up forces in direct opposition to the distorting forces acting to deform the polished planar face thereof. As has already been mentioned, each of the mirror constructions of Figures 5 through 8 provide a successively greater correction and, therefore, although all these designs will function to counteract the forces tending to distort the polished face of the mirror, thus constituting a considerable advance over the prior art mirrors, one of the designs of those shown will provide the optimum correction required in a given rotating mirror system. In other words, the degree of distortion present in a given rotating mirror system is dependant upon several factors among which are the Young's Modulus of the steel or other metal from which the mirror is formed, the Poisson's Ratio of the material, and the density thereof. Therefore, if the characteristics of a certain mirror material were such that they would produce a high degree of distortion in the planar polished face, the finished mirror would require maximum correction for optimum operation and the mirror designs of Figures 7 or 8 would be preferred although the remaining designs would bring about a substantial and significant improvement. On the other hand, if the physical constants of the mirror material were such that only a slight distortion of the planar polished face would take place, the mirror constructions shown in Figures 5 or 6 would be preferable as they would function to maintain the polished face substantially planar. Also to be noted is the fact that the axis of rotation which passes through the center of mass of the block in each of the constructions of Figures 5 through 8, inclusive, lies closest to the plane polished face 18. Thus the concentration of mass opposite the plane face tends to bend the plane polished face and make it convex which acts in opposition to the effect of the tensional forces acting on the sides of the block to bend the polished face into a concave shape.

The tensional forces tending to stretch the mirror as shown in Figure 2 are reduced to some extent by the constructions of Figures 5 through 8, inclusive, due to the reduction in mass pulling on the sides of the mirror; however, it has been found that the improved construction not only reduces the forces tending to render the polished face of the mirror concave but also sets up counteracting forces within the block which equalize the deforming forces and maintain the polished surface planar.

Figure 4:
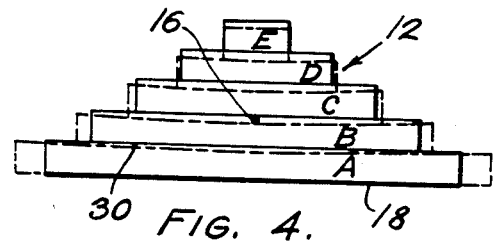
Figure 4 is a diagram illustrating the basic design of the improved rotating mirror of the present invention and some of the forces which are believed to counteract those forces tending to deform the polished surface of the mirror thus providing a plane polished surface of the type needed for an accurate reflection of the image.
Figure 6:
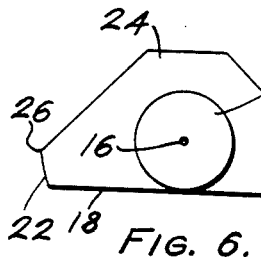

One explanation of this unexpected result is illustrated diagrammatically in Figure 4. If the block is considered as being made up of a plurality of thin plates A, B, C, D and E formed integral with one another and each narrower than the one before it, it becomes apparent that A will stretch more than B, B more than C, etc. under the tensional forces exerted thereon when the block is rotated about its center of mass. The relative degree of stretching of each of the thin plates has been illustrated diagrammatically by the dotted line portions. When, however, A stretches relative to B, B acts upon A to prevent A from stretching along the interface 30 therebetween. This retardant action of B upon A forces A to bend and form a convex surface at 18. Therefore, this action tends to offset and equalize the counteracting forces operating to make the polished face concave.

In connection with Figures 9 and 10 it will be seen that it is necessary to maintain the axis of rotation 16 as close as possible to the plane polished face 18 of the mirror in order to utilize the greatest portion of the reflected image. In Figures 9 and 10 the maximum useful area of a light beam impinging upon the polished face of the mirror is that included within the area of the polished face of the mirror when said polished face is normal to the light beam as shown in full lines. In this normal position, both mirrors reflect the same area of the light beam as both have polished faces of equal area. When, however, the mirrors are moved through an angle of 45° in order to reflect the light beam at right angles to its angle of incidence it will be seen that the mirror of Figure 10 reflects a considerably narrower beam *a* than beam *b* of the Figure 9 mirror due to the greater distance of the polished surface of the Figure 10 mirror from the axis of rotation. Thus, the image must be confined to a much smaller area of the polished surface of the Figure 10 mirror than that of the Figure 9 mirror in order to be reflected in toto throughout forty-five degrees of angular rotation of the mirrors. It, therefore, becomes of extreme importance to maintain the plane polished surface of the mirror as close as practicable to the axis of rotation. In order to achieve the same results with the Figure 10 mirror as are achieved with the Figure 9 mirror, the Figure 10 mirror would have to be made considerably wider which would result in a corresponding decrease in the speed of rotation that could be achieved without the mirror bursting.

From the foregoing description of the drawing it will be seen that the improved high speed turbine-driven rotating mirror of the present invention has many advantages over those heretofore used, and therefore:

I claim:

1. A turbine-driven high speed rotating mirror for use in sequence cameras of the framing or sweeping image types comprising: a block of opaque material mounted for rotation about its center of mass, the block having at least three planar faces in spaced parallel relation to the axis of rotation, two of said faces being substantially equal in area and the third being larger, the larger face being polished to provide a mirror, the perpendicular distances from the equal planar faces to the axis of rotation being substantially equal, and the perpendicular distance from the larger polished planar face to the axis of rotation being less than the perpendicular distance to either of the equal planar faces.

2. A turbine-driven high speed rotating mirror for use in sequence cameras of the framing or sweeping image types comprising: a block of opaque material mounted for rotation about its center of mass, the block having a planar polished face forming a mirror surface, said planar polished face being spaced parallel from the axis of rotation of the block, the mass of the block decreasing from the axis of rotation toward the sides of the block adjacent the polished surface thereof, and the polished surface of the block approaching the axis of rotation more closely than any other point on the surface of the block.

3. A turbine-driven high speed rotating mirror for use in sequence cameras of the framing or sweeping image types comprising: a cylindrical drive shaft; a block of opaque material formed on the drive shaft for conjoint rotation therewith, the axis of rotation of the block and drive shaft passing through the center of mass of the block, the block having a planar polished face forming a mirror surface, said planar polished face being spaced parallel from the axis of rotation and tangent to the cylindrical surface of the drive shaft, the remaining portions of the block being farther away from the axis of rotation than the polished face at its point of tangency with the drive shaft.

4. A turbine-driven high speed rotating mirror for use in sequence cameras of the framing or sweeping image types comprising: a block of opaque material mounted for rotation about its center of mass, the block having a planar polished face forming a mirror surface, said planar polished face being spaced parallel from the axis of rotation of the block, and the block having a portion of the mass thereof concentrated on the opposite side of the block from the planar polished face, said mass acting under centrifugal force to deform the polished face and render said face convex in opposition to those forces tending to form a concavity therein.

5. A turbine-driven high speed rotating mirror for use in sequence cameras of the framing or sweeping image types comprising: a block of opaque material mounted for rotation about its center of mass, the block having three planar faces in spaced parallel relation to the axis of rotation, two of said faces being substantially equal in area and the third larger in area than the other two, the larger face being polished to provide a mirror surface, said three planar faces defining planes intersecting to form a prism having an isosceles triangular cross section.

UNITED STATES PATENTS

References Cited in the file of this patent 2,493,795    Wikkenhauser et al. _____ Jan. 10, 1950